No. 892,274. PATENTED JUNE 30, 1908.
L. G. LEFFER.
FLUSHING TANK.
APPLICATION FILED FEB. 20, 1907.

WITNESSES: Louis G. Leffer, INVENTOR.
ATTORNEY.

UNITED STATES PATENT OFFICE.

LOUIS GEORG LEFFER, OF COLOGNE-LINDENTHAL, GERMANY.

FLUSHING-TANK.

No. 892,274.  Specification of Letters Patent.  Patented June 30, 1908.

Application filed February 20, 1907. Serial No. 358,339.

*To all whom it may concern:*

Be it known that I, LOUIS GEORG LEFFER, engineer, subject of the German Emperor, residing at Cologne-Lindenthal, Rhenish Prussia, and Empire of Germany, have invented a new and useful Improvement in Flushing-Tanks, of which the following is a specification.

This invention relates to a flushing tank in which outlet valves are entirely dispensed with, but which at the same time is provided with means preventing waste of the water, the arrangement being such that the tank cannot be completely emptied a second time until it has become completely filled again. There is employed a float and a flexible siphon tube or pipe that may be coupled to this float. Assuming the tank to be filled and the coupling parts disconnected, the free end of the flexible tube or pipe will immediately sink down to and upon the bottom of the tank, the whole tube or pipe being thereby turned into a siphon which now in its turn empties the tank. As soon as the slowly sinking float that falls with the level of the water, has reached the free end of the outlet-tube or siphon, the coupling parts automatically reëngage and as at the same time, owing to the inlet-valve having been opened by the sinking float, water flows into the tank, the float begins to rise and takes the flexible tube with it. When the float has reached its former high position, the coupling device is in coaction with releasing mechanism, the inlet-valve closes automatically, and then the tank is again ready for further use.

Figure 1:
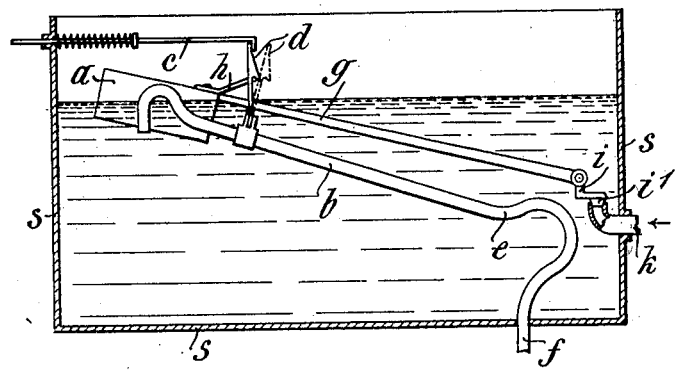
Figure 2:
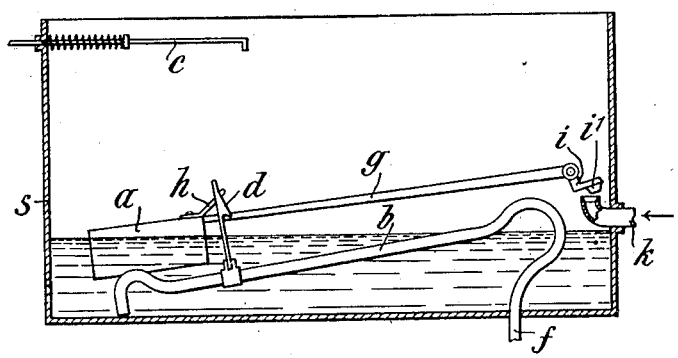
Figure 3:
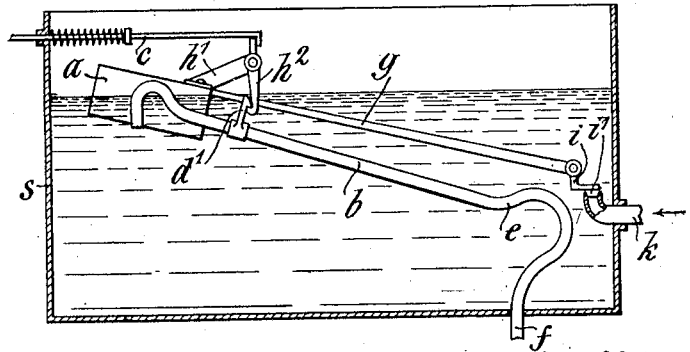

In the accompanying drawing, Figure 1 is a longitudinal section through one form of construction of the improved flushing-tank, showing said tank filled and the apparatus ready for use. Fig. 2 shows the tank nearly emptied, the longer arm of the flexible tube or pipe, *i. e.* of the siphon, being supported by the bottom of the tank and the coupling-parts just about to reëngage with each other. Fig. 3 is a view similar to Fig. 1, but showing a modified form of construction.

The tank $s$ has an outlet $f$ formed by one end of the flexible pipe $b$. This portion of the pipe, from the outlet $f$ to about the point $e$, is however, not flexible, but rigid, and the whole pipe may, therefore, if desired, consist of two pieces connected at $e$ in any manner appropriate to the purpose. It is thus sufficient if the two rigid portions of the pipe are connected by a piece of flexible tube, a piece of india rubber hose, or the like. Near to its free end, the pipe $b$ has a yielding hook $d$ adapted to engage over, and be supported by a rigid hook $h$ secured to the float $a$. The hook $d$, however, may be rigid and the hook $h$ may be yielding, or even both may be yielding, or any other suitable coupling for the float $a$ and the pipe $b$ may be employed.

The coupling formed by the hooks $d$ and $h$ may be broken by means of a draw-rod $c$ when the float is in its highest position, for the hook $d$ will then be in such a position that it can be actuated by said rod. The float $a$ is secured to a bar $g$, and connected by the same with a bell-crank lever $i$ provided at one end with a valve $i'$ for the inlet-pipe $k$. Assuming the tank filled and the parts as disclosed in Fig. 1, the pipe $e$ will be empty, inasmuch as a portion of it is above the level of the water, as illustrated. If now, the draw-rod $c$ is moved outwardly, the hook $d$ will be disengaged from the hook $h$ and the pipe will drop to the bottom of the tank. Immediately a siphonic action will take place, and inasmuch as the water permitted to flow into the tank is less than that which will discharge therefrom in a given time, the discharge of the water will continue until the tank is emptied, and the siphon broken. As the level of the water falls, the float will move downwardly with it, and as a consequence the supply valve $i$ will open, permitting an inflow of water. When the level of the water in the tank is sufficiently low, the hook or keeper $h$ will reëngage the latch or hook $d$ as will be evident by reference to Fig. 2, and consequently as soon as the siphon is broken and the tank begins to fill, the float will carry the inlet end of the pipe $d$ up with it, preventing any outflow therethrough. The parts will consequently reassume their original position, and in this connection, it will be noted that the tank cannot be again operated until entirely refilled.

In the form of construction shown in Fig. 3, the rigid or elastic hook $h$ of the before-described form is replaced by an oscillating hook $h^2$ supported by an arm $h'$ fixed to the float, and the hook $d$ of said other form is replaced by a hook $d'$ adapted to take over, and be supported by, said hook $h^2$. The coupling thus formed may also in this case be broken by a draw-rod c whereupon the action will be exactly the same as that before described.

Having now described my invention what I desire to secure by a Patent of the United States is:

1. In a flushing-tank, the combination of the tank; a float adapted to be lowered and raised by the water in the tank; an inlet-valve; a connection between this valve and said float; an outlet-pipe, one end of which is fixed to the tank and the other end of which is adapted to be lowered or raised inside the tank; means for automatically coupling this end of said pipe to the float, and means for breaking this coupling.

2. In a flushing-tank, the combination of the tank; a float adapted to be lowered and raised by the water in the tank; an inlet-valve, a connection between this valve and said float; a flexible outlet-pipe, one end of which is fixed to the tank and the other end of which is adapted to be lowered or raised inside the tank; means for automatically coupling this end of said pipe to the float, and means for breaking this coupling.

3. In a flushing-tank, the combination of the tank; a float adapted to be lowered and raised by the water in the tank; an inlet-valve; a connection between this valve and said float; an outlet-pipe, one end of which is fixed to the tank and the other end of which is adapted to be lowered or raised inside the tank; a hook attached to this portion of said pipe; another hook attached to the float and adapted to be automatically coupled with, and to be positively disconnected from, the first-mentioned hook, and means for thus actuating said second hook.

4. In a flushing-tank, the combination of the tank; a float adapted to be lowered and raised by the water in the tank; an inlet-valve; a connection between this valve and said float; a flexible outlet-pipe, one arm of which is fixed to the tank and the other arm of which is adapted to be dropped inside the tank and to be raised by the float; means for automatically coupling said latter arm to said float, and means for breaking said coupling.

5. In a flushing-tank, the combination of the tank; a float adapted to be lowered and raised by the water in the tank; an inlet-valve; a connection between this valve and said float; a flexible outlet-pipe, one arm of which is fixed to the tank and the other arm of which is adapted to be dropped inside the tank and to be raised by the float; a hook attached to the movable arm of said pipe; another hook attached to the float and adapted to be automatically coupled with, and to be positively disconnected from, the first-mentioned hook, and means for thus actuating said second hook.

6. In a flushing-tank, the combination of the tank; a float adapted to be lowered and raised by the water in the tank; an inlet-valve; a connection between this valve and said float; an outlet-pipe, one end of which is fixed to the tank and the other end of which is adapted to be lowered or raised inside the tank; an elastic hook attached to this portion of said pipe; a rigid hook attached to the float and adapted to be automatically coupled with said elastic hook and to support the same, and means for making the elastic hook loose its support, for the purpose set forth.

7. In a flushing-tank, the combination of the tank; a float adapted to be lowered and raised by the water in the tank; an inlet-valve; a connection between this valve and said float; a flexible outlet-pipe, one arm of which is fixed to the tank and the other arm of which is adapted to be dropped inside the tank and to be raised by the float; an elastic hook attached to the movable arm of said pipe; a rigid hook attached to the float and adapted to support said other hook with its pipe; and means for making the said other hook leave the first-mentioned hook, substantially as described.

8. The combination with a tank, of a discharge pipe having an inlet end movable to different heights within the tank, and a float in the tank having detachable connections with said inlet end for raising it and permitting it to lower to permit the discharge from the tank through said pipe.

9. The combination with a tank, of a discharge pipe having an inlet end movable to different heights within the tank, a float located in the tank, detachable connections between the float and movable pipe, and means for detaching the pipe from the float to permit the former to drop and thereby allow the discharge from the tank therethrough.

10. The combination with a tank, of a discharge pipe having an inlet end movable to different heights within the tank, a swinging arm in the tank, a float carried by the arm, a latch connection between the float and pipe, and means for operating the latch to release the pipe from the float when the same are in their raised positions.

In testimony, that I claim the foregoing as my own, I have hereto affixed my signature in the presence of two witnesses.

LOUIS GEORG LEFFER.

Witnesses:
 BESSIE F. DUNLAP,
 LOUIS VANDORN.